United States Patent [19]

Yamada et al.

[11] Patent Number: 4,983,807
[45] Date of Patent: Jan. 8, 1991

[54] METHOD AND APPARATUS FOR PLASMA CUTTING A WORKPIECE

[75] Inventors: Osamu Yamada, Aichi; Hisaaki Yamane, Kasugai; Kunio Kohsaka, Nagoya, all of Japan

[73] Assignee: Brother Kogyo Kabushiki Kaisha, Japan

[21] Appl. No.: 529,480

[22] Filed: May 29, 1990

[30] Foreign Application Priority Data

May 29, 1989 [JP] Japan .................................. 1-137051

[51] Int. Cl.$^5$ .............................................. B23K 9/00
[52] U.S. Cl. .......................... 219/121.48; 219/121.54; 219/121.57; 219/130.1; 219/121.59
[58] Field of Search ...................... 219/121.59, 121.54, 219/121.55, 121.57, 76.16, 130.4, 130.1, 130.5

[56] References Cited

U.S. PATENT DOCUMENTS

4,493,696 7/1990 Thommes ................... 219/121.54

Primary Examiner—M. H. Paschall
Attorney, Agent, or Firm—Oliff & Berridge

[57] ABSTRACT

In a plasma cutting apparatus for cutting a workpiece with a plasma arc, a cutting torch moves relative to the workpiece. The cutting torch produces plasma arc in accordance with a cutting current supplied thereto. To improve surface roughness of the cut facet of the workpiece, a pulsating current is superimposed on a D.C. current to provide the cutting current, wherein the frequency of the pulsating current is controlled in accordance with the moving speed of the cutting torch.

8 Claims, 5 Drawing Sheets

METHOD AND APPARATUS FOR PLASMA CUTTING A WORKPIECE

BACKGROUND OF THE INVENTION

The present invention relates to method and apparatus for plasma cutting a workpiece. More particularly, the invention relates to such method and apparatus in which a surface roughness of the cut facet of the workpiece is improved by controlling the frequency of a pulsating current to be superimposed on a D.C. cutting current in accordance with the moving speed of a cutting torch.

Plasma cut is used for cutting a workpiece, in which plasma arc energy generated from a cutting torch (hereinafter referred simply to as "torch") is locally concentrated onto the workpiece, thereby melting the workpiece. While the plasma cut is advantageous in that the cutting speed is fast and a cutting deformation is unlikely to occur, it is disadvantageous in that complicated surface irregularities are formed on the cut facet of the workpiece due to distorted flow of plasma gas stream and/or shift of the anode point in the workpiece. It is further disadvantageous in that a large amount of melted metal resulting from the plasma arc adhere to the workpiece as dross.

Japanese Patent Laid-Open Publication No. 61-262464 discloses a technique for reducing the adhesion of the dross, in which a 400 Hz pulsating current which frequency is relevant in removing the dross is superimposed on a D.C. cutting current (base current).

Generally, in the cases where the cut facet of the workpiece is formed with irregularities and thus the surface roughness is extraordinarily low and where the dross is adhered to the cut facet thereof, the cut facets are ground by a grinder to thus smoothen the cut facet.

The present inventors have found that the cut facet irregularities is suppressed to a minute level if a pulsating current having a relatively low range frequency, e.g. 100 to 500 Hz, is superimposed on a D.C. current to supply the resulting current to the torch.

In the plasma cutting apparatus disclosed in the above-mentioned publication, since a pulsating current of a constant 400 Hz is superimposed on the cutting current, adhesion of the dross can effectively be prevented and the surface roughness may be improved to some extent. However, when the cutting speed is varied depending on the kind of the material of the workpiece, the thickness thereof, and the cutting path, such as curves including arcuate or segmental curves, the number of pulses of the pulsating current allocated to a unit length of the cut length is not constant, so that the surface roughness cannot be uniformly improved all over the cut facet.

High frequency pulsating current is not effective in improving the surface roughness as the plasma arc does not respond to the frequency of the pulsating current.

SUMMARY OF THE INVENTION

The present invention has been made in view of the foregoing, and it is an object of the present invention to provide method and apparatus for plasma cutting a workpiece, in which the surface roughness of the cut facet can be uniformly improved all over the cut facet and consumption electrical power can be reduced to a possible minimum.

To achieve the above and other objects, there is provided according one aspect of the invention an apparatus for plasma cutting a workpiece comprising a cutting torch having a nozzle and an electrode for producing a plasma arc in accordance with a cutting current supplied to the electrode, the cutting torch being movably disposed relative to the workpiece and cutting the workpiece with the plasma arc, power supply means for supplying the cutting current to the electrode of the cutting torch, the power supply means including a D.C. current supplying means for supplying a D.C. current, pulse generating means for generating a pulsating current having a frequency, and superimposing means for superimposing the pulsating current on the D.C. current to produce the cutting current, moving means for moving the cutting torch relative to the workpiece, storage means for storing cut machining data, drive control means for numerically controlling the moving means in accordance with the cut machining data read out of the storage means, the moving means moving the cutting torch at a speed relative to the workpiece, speed detection means for detecting the moving speed of the cutting torch relative to the workpiece and outputting speed data, and frequency control means responsive to the speed data for controlling the frequency of the pulsating current generated from the pulse generating means.

In accordance with the present invention, the drive control means numerically controls the moving speed in accordance with the cut machining data to move the cutting torch relative to the workpiece. At this time, the cutting torch is supplied with the cutting current which is generated by superimposing the pulsating current on the D.C. current. The cutting torch produces the plasma arc in response to the cutting current, whereby the workpiece is cut by the plasma arc produced therefrom. On the other hand, the speed detection means receives data regarding the movement of the cutting torch relative to the workpiece. The frequency control means controls the frequency of the pulsating current generated from the pulse generating means in response to the speed data supplied from the speed detection means. In this manner, the frequency of the pulsating current is controlled depending on the moving speed of the cutting torch relative to the workpiece, i.e., the cutting speed. Therefore, fine pitch drag lines are formed in the cut facet of the workpiece and the irregularities in the cut facet are improveds. The surface roughness over the cut facet of the workpiece is therefore improved. In addition, the adhesion of the dross can effectively prevented.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
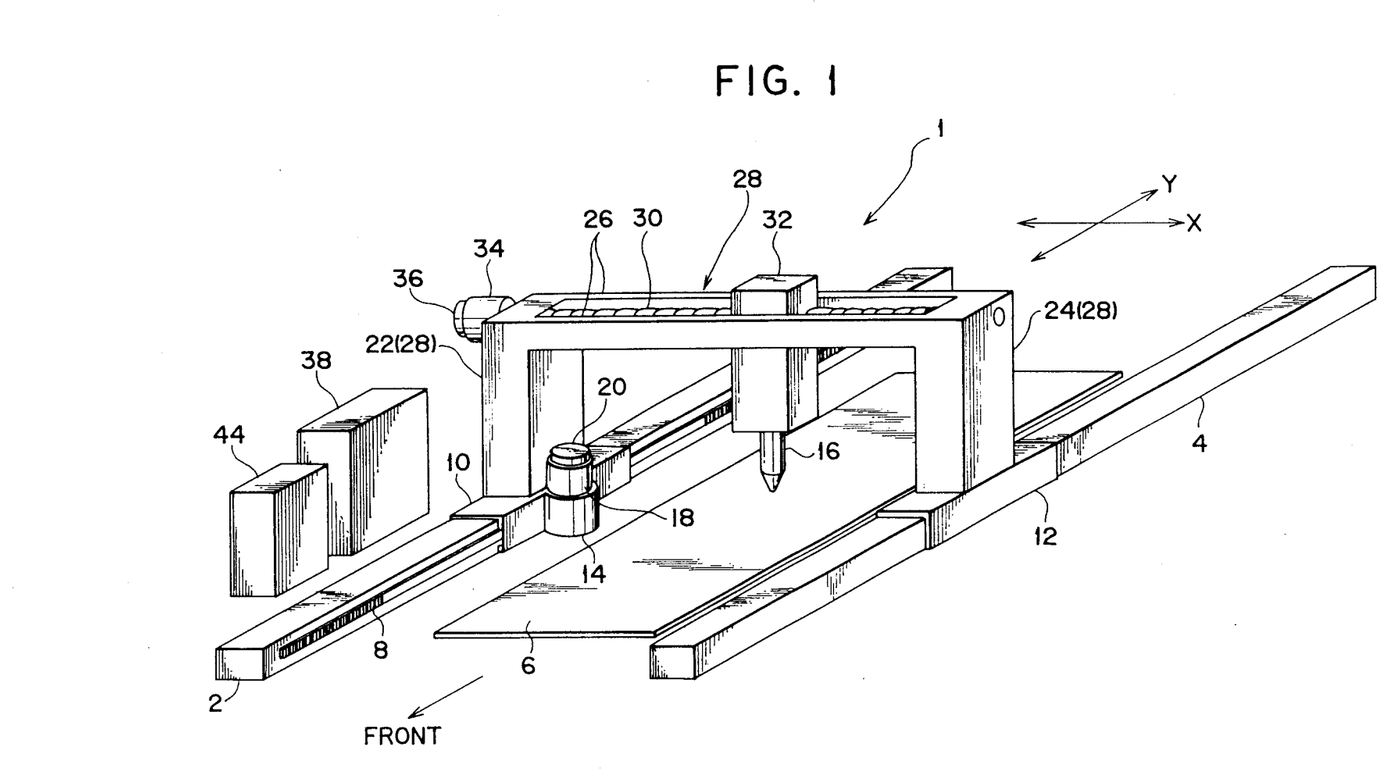
FIG. 1 is a perspective view showing a plasma cutting apparatus according to the present invention.

Referring to FIG. 1, description will be made with reference to a plasma cutting apparatus 1 in which numerical control of the movement of a torch is performed.

A pair of guide rails 2, 4 extending in a Y-direction have a rectangular cross-section and are disposed on a floor in parallel to each other with a certain distance therebetween. A rack member 8 having racks thereon is secured to the inner surface of the lefthand guide rail 2 substantially over the entire length of the guide rail 2. A workpiece 6 which is subjected to cut machining is disposed between the guide rails 2, 4.

On the guide rails 2, 4, a torch conveying frame 28 is frontwardly and rearwardly movably disposed. The frame 28 is in a gate-like configuration which is made up of a moving member 10 movably engaged with the guide rail 2, another moving member 12 movably engaged with another guide rail 4, a column 22 extending upwardly of the upper surface of the moving member 10, another column 24 extending upwardly of the upper surface of the moving member 12, and a pair of support members 26 bridging over the two columns 22, 24 in parallel with each other.

A protrusion 14 is formed in the inner surface of the moving member 10. A Y-axis servo motor 18 is accommodated in the protrusion 14, which moves the torch 16 in the Y-direction, i.e., frontwardly and rearwardly. A pinion (not shown) is secured to the shaft of the Y-axis servo motor 18 and threadingly engages the racks on the rack member 8. An encoder 20 is provided in association with the Y-axis servo motor 18 for outputting a feedback signal YS (to be described later with reference to FIG. 4). In accordance with the rotation of the Y-axis servo motor 18, the moving member 10 slidingly moves frontwardly and rearwardly (in the Y-direction) through threading engagement with the pinion and rack. The moving member 12 is also guided by the associated guide rail 4 and is frontwardly and rearwardly moved, whereby the torch conveying frame 28 is moved in the Y-direction.

A drive shaft 30 formed with a helical groove adapted to threadingly engage a ball screw is bridged between the columns 22, 24. Both ends of the drive shaft 30 are rotatably supported on the upper ends of the columns 22, 24. A block member 32 is in threading engagement with the drive shaft 30 through a ball screw block. The front or rear face of the block member 32 is slidingly engaged with a guide portion (not shown) formed in the corresponding one of the support members 26 so that the block member 32 is slidingly movable while being guided by the guide portion. In the left end portion of the drive shaft 30, there is secured the drive shaft of an X-axis servo motor 34 serving to move the torch 16 in the X-direction (rightwardly or leftwardly). An encoder 36 is provided in association with the X-axis servo motor 34 and produces a feedback signal XS (to be described later with reference to FIG. 4). When the X-axis servo motor 34 is driven, the drive shaft 30 is rotated. Then, through the threading engagement between the helical groove and the ball screw block, the torch 16 moves rightwardly or leftwardly together with the block member 32. To summarize, the torch 16 can be moved to a desired cutting position by the combined drivings of the X- and Y-axis servo motors 34, 18.

There is provided a control box 38 in which accommodated are a drive controller 40 (to be described later) and a plasma arc power supply unit 42 (to be described later) for supplying a cutting current to the torch 16. There is further provided a control panel 44 having a plurality of character keys and ten keys used for manually inputting torch locus data and for manually specifying a kind of the workpiece material, a thickness thereof, and a cutting condition. A start switch for instructing commencement of the cutting operation is also provided in the control panel 44.

Although not shown in the figures, the plasma cutting apparatus 1 is provided with a gas supply device for supplying an operation gas to the torch 16, and a cooling device for cooling the nozzle 62. Various kinds of cables, operation gas supply hose and a cooling water supply hose are designed to be flexibly movable in accordance with the movement of the torch 16. Such cables include drive current supply cables connected to the motors 18, 34, current supply cables connected to magnetic field generators, and control cables.

Figure 2:
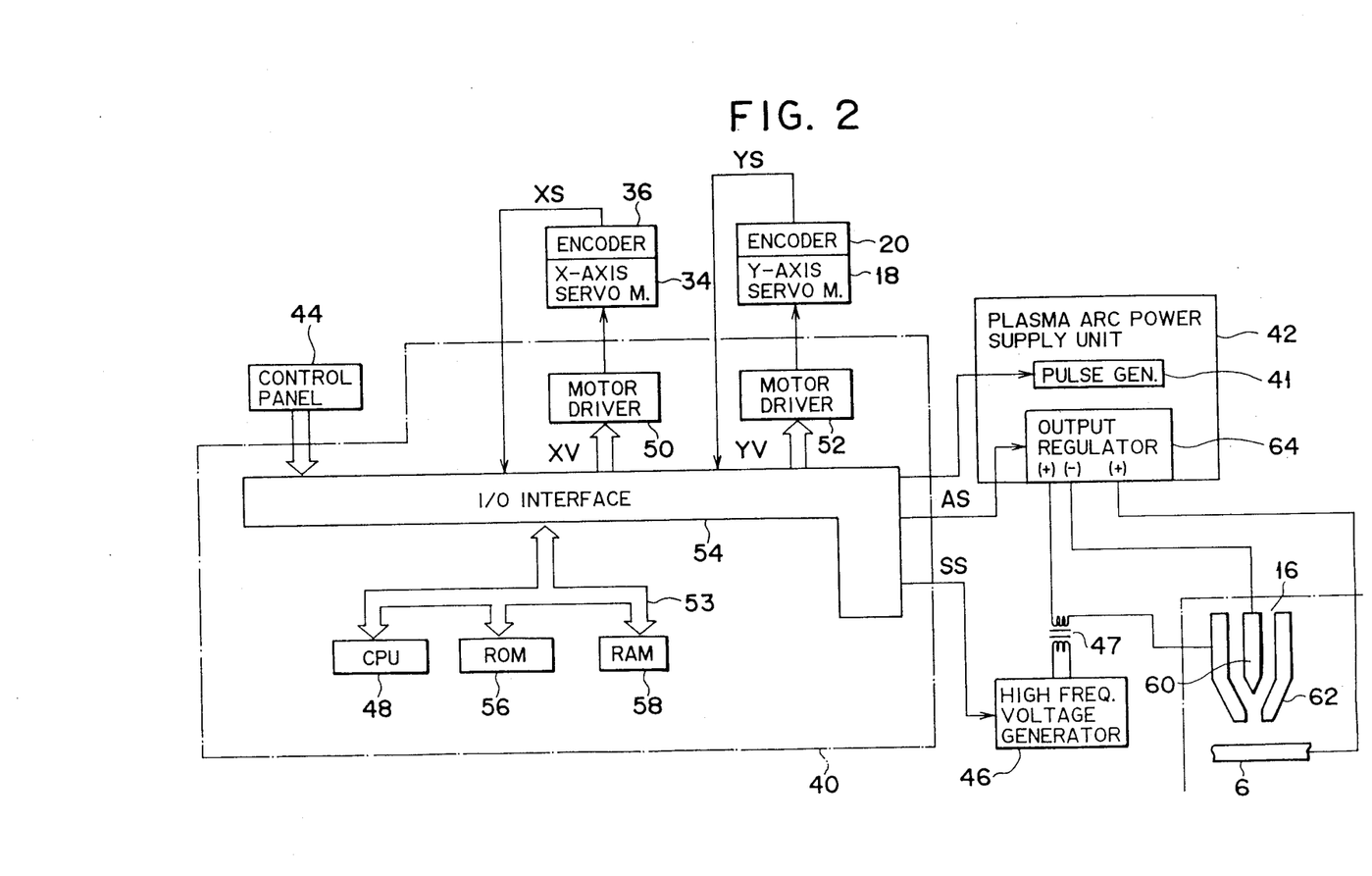
FIG. 2 is a block diagram showing a control system of the plasma cutting apparatus.

Next, a control system of the plasma cutting apparatus 1 will be described with reference to FIG. 2.

The control system of the plasma cutting apparatus 1 is basically made up of a control panel 44, the X-axis servo motor 34, the Y-axis servo motor 18, a plasma arc power supply unit 42, a high frequency voltage generator 46, and a drive controller 40. The driver controller 40 includes a central processing unit (CPU) 48, motor drivers 50, 52, an input/output interface connected to the CPU 48 through a bus 53, a read-only memory (ROM) 56, and a random access memory (RAM) 58.

The control panel 44 and the motor drivers 50, 52 are connected to the input/output interface 54. The X- and Y-axis servo motors 34, 18 are connected to the motor drivers 50, 52, and encoders 36, 20 are in turn connected to the X- and Y-axis servo motors 34, 18, respectively. Feedback signals XS and YS are produced respectively from the encoders 36 and 20 and are applied to the input/output interface 54.

The plasma arc power supply unit 42 uses a commercial A.C. power supply and supplies a cutting current I (see FIG. 3) to an electrode 60 of the torch 16. The power supply unit 42 includes a pulse generator 41 which generates a pulsating current $I_P$. The pulsating current $I_P$ is superimposed on a D.C. cutting base current $I_B$ and the resulting cutting current I is supplied to the electrode 60 through an output regulator 64. The pulse generator 41 is capable of arbitrarily changing the frequency of the pulsating current $I_P$ in response to a frequency signal fed from the drive controller 40. The output regulator 64 changes the effective value of the cutting base current $I_B$ in response to an adjusting signal AS supplied from the CPU 48 through the input/output interface 54, and the resultant cutting current I is supplied to the electrode 60. The output regulator 64 has a positive terminal connected to the workpiece 6 and a negative terminal connected to the electrode 60.

Precedent to the commencement of the plasma cutting, the high frequency voltage generator 46 generates a high frequency voltage which is applied through a coupling coil 47 to the nozzle 62 of the torch 16 to impress a high frequency voltage thereto. The high frequency voltage generator 46 continuously generates the high frequency voltage during a period of time when it is being supplied with a start signal SS from the CPU 48 through the interface 54.

The following programs and data have been stored in advance in the ROM 56.

(1) Interpolation computing program for computing drive control amounts of the servo motors 18, 34 every minute period of time based on torch locus data, the torch 16 being moved by the servo motors 18, 34 in accordance with the drive control amounts thus computed;

(2) Numerical control program for controlling the drivings of the servo motors 20, 36 based on both position data obtained through the interpolation program and another position data detected by the encoders 20, 36;

(3) Frequency control program for controlling the frequency of the pulsating current $I_P$ produced from the pulse generator 41 based on the moving speed of the torch 16; and (4) Tables containing cutting base current data and cutting speed data in relation to parameters regarding workpiece material data and workpiece thickness data.

The frequency control program includes a first subroutine for computing the torch moving speed V relative to the workpiece 6 based on the drive signals XV and YV respectively outputted from the motor drivers 50 and 52 when the servo motors 18 and 34 are driven in accordance with the numerical control program, and a second sub-routine for computing the frequency f of the pulsating current $I_P$ in accordance with an equation defined by $f(Hz) = K \times V$ (mm/sec) where V is the torch moving speed.

Each of the tables concerning the cutting base current and the cutting speed separately contains experimentally or experientially obtained data in relation to each of the parameters of the workpiece material data and the workpiece thickness data so as to generate a stable plasma arc between the electrode 60 and the workpiece 6 and to obtain high quality cut facet.

The RAM 58 has a storage location for temporarily storing torch locus data regarding cutting paths starting from the cut start positions and ending with the cut termination positions with respect to a plurality of cut machinings. The RAM 58 has another storage location for temporarily storing data resulting from the computation effected by the CPU 48.

Description will next be made with respect to a surface roughness (Rmax) of a cut facet when a steel plate is subjected to a plasma cutting while supplying a cutting current I to the torch electrode 60.

Figure 4:
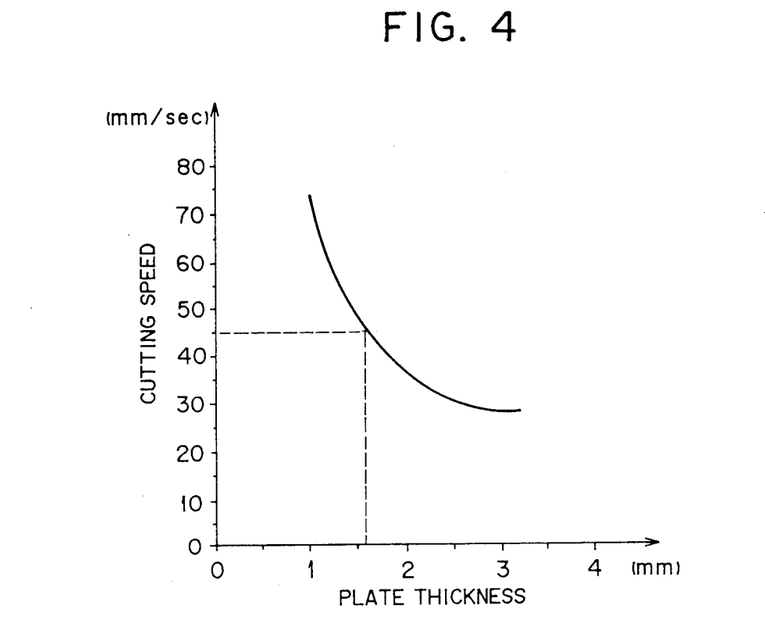
FIG. 4 is a graphical representation showing a relationship between a thickness of a steel plate and a cutting speed thereof.

FIG. 4 is a graphical representation illustrating a relationship between a steel plate thickness and a cutting speed wherein the curve indicates a relevant cutting speed which gives a desirable cut quality when a steel plate of a given thickness is linearly cut. The cutting speeds at which stainless steels are linearly cut is substantially equal to the cutting speeds of the steel plates. On the other hand, the cutting speed at which aluminum plates are linearly cut is about 20 to 40% faster than the cutting speeds of the steel plates.

Figure 5:
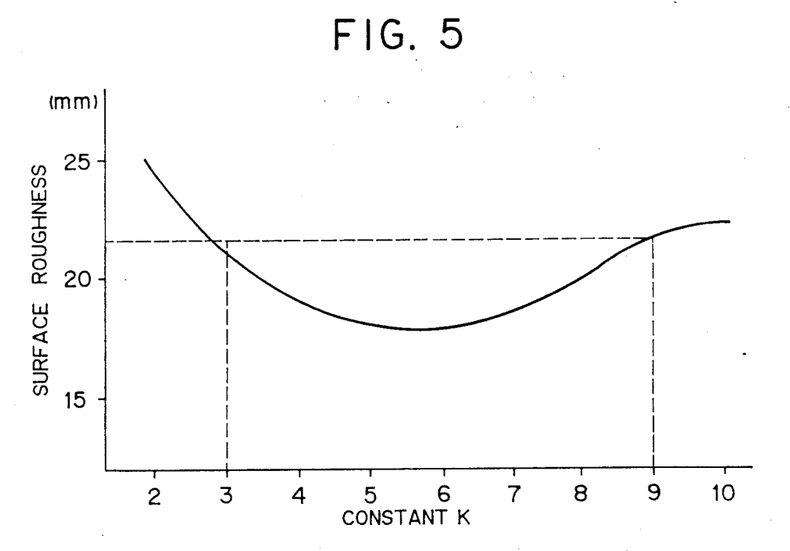
FIG. 5 is a graphical representation showing a relationship between a constant K and a surface roughness.
Figure 6:
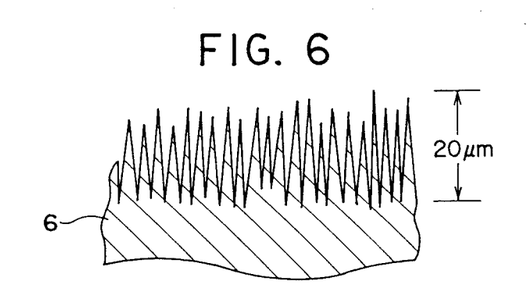
FIG. 6 is an enlarged cross-section showing the cut facet of a workpiece cut according to the plasma cutting apparatus of the present invention.

FIG. 5 is also a graphical representation illustrating a relationship between a constant K and the surface roughness (Rmax) of a 1.5 mm thickness steel plate whose cutting speed V is set to 45 (mm/sec) and whose cutting current I is determined by superimposing the pulsating current $I_P$ on the cutting base current $I_B$ wherein the constant K in the aforementioned equation $f = K \times V$ is varied to give the frequency of the pulsating current $I_P$. The equation $f = K \times V$ means that K-number pulses are superimposed on the cutting current I during cutting the steel plate by 1 mm. With the constant K set to smaller than three (3), the frequency f of the cutting current I is unduly low (lower than about 135 Hz), with the result that the pitch of the drag line is widened (more than about 300 microns) and irregularities are noted on the cut facet which may be caused by the distorted plasma gas stream or the shift of the anode point. Consequently, the surface roughness is degraded in comparison with the case where the pulsating current $I_P$ is not superimposed. On the other hand, with the constant K set to larger than nine (9), the frequency f of the cutting current I is unduly high (higher than 405 Hz), therefore, the pitch of the drag line is narrowed (less than about 120 microns) but response of the plasma arc with respect to the frequency f is degraded. Hence, improvement of the surface roughness cannot be achieved. With the constant K set in the range of $3 \leq K \leq 9$, the plasma current is periodically changed every minute time in synchronism with the frequency of the cutting current I and the drag line is formed at an appropriate pitch. No irregularities are outstanding on the cut facet and the cut facet is smoothed. The surface roughness in the entire cut facet cut along a straight line or a curve is stabilized and improved. FIG. 6 is an enlarged cross-section showing a cut facet of a steel plate which is plasma cut with a cutting current I determined by the constant K falling in the range noted above.

Similar surface roughness as shown in FIG. 5 is obtainable with respect to steel, stainless, and aluminum plates of several millimeters thickness if these are plasma cut with the cutting current I computed by the aforementioned equation while setting the constant K in the range of $3 \leq K \leq 9$. In order to further improve the surface roughness, it is desirable that the constant K be set in the range of 3 to 6 with respect to the aluminum plate which is a relatively soft material and in the range of 5 to 8 with respect to the steel plate and stainless plate.

Figure 7:
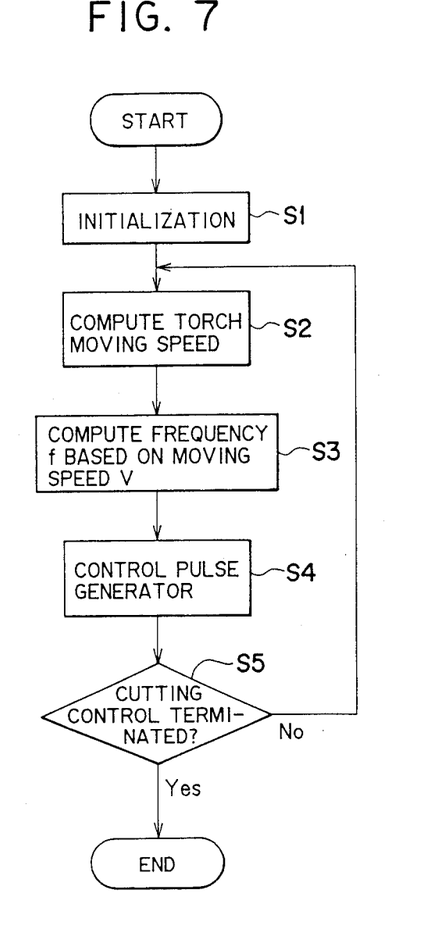
FIG. 7 is a flow chart for description of a frequency control routine.
Figure 8:
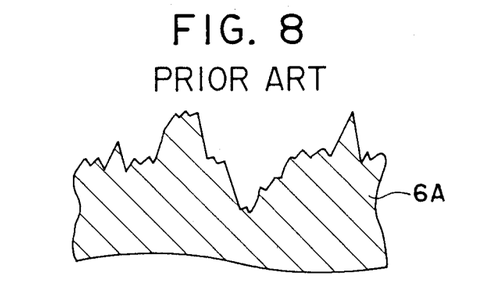
FIG. 8 is an enlarged cross-section showing the cut facet of a workpiece cut according to a conventional apparatus.

Next, a frequency control program executed in the drive controller 40 will be described while referring to the flow chart illustrated in FIG. 7.

The frequency control program is started in response to the manipulation of a start switch provided in the control panel 44, whereupon an initialization is carried out (step 1). In the initialization stage, the cutting current I is supplied to the torch electrode 60, wherein the output regulator 64 is controlled in response to the adjusting signal AS determined on the basis of the current data read out of the cutting base current table with respect to the specified material data and thickness data. Further, the torch 16 is moved in accordance with the cutting speed data read out of the cutting speed table. A pilot arc is taken place between the electrode 60 and the nozzle 62 in accordance with activation of the high frequency voltage generator 46, and ionized gaseous matter resulting from the pilot arc acts as a plasma stream and impinges upon the workpiece 6. A main arc (plasma arc) is therefore taken place between the electrode 60 and the workpiece 6, thereby cutting the workpiece 6.

Figure 3:
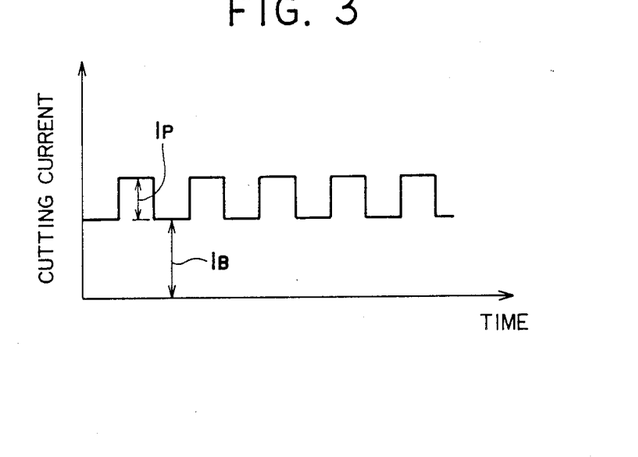
FIG. 3 is a waveform diagram showing a cutting current supplied to a torch electrode.

Next, in order to control the drivings of the X- and Y-axis servo motors 34, 18 in accordance with the numerical control program, the moving speed V of the torch 16 is computed in accordance with the sub-routine based on the drive signals XY and YV outputted respectively to the motor drivers 50 and 52 (step 2). Based on the moving speed V, the frequency f is obtained from the sub-routine (step 3). When computing the frequency, the constant K is appropriately selected from the range of $3 \leq K \leq 9$ depending on the kind of the material. For example, the constant K is selected to 6 with respect to both the soft steel plate and the stainless plate and 5 with respect to the aluminum plate. Based on the frequency f thus computed, the pulse generator 41 is controlled and the cutting current I is supplied to the electrode 60 (step 4). The cutting current I as shown in FIG. 3 is supplied from the output regulator 64 and is applied to the electrode 60, wherein the cutting current I is such that the pulsating current outputted from the pulse generator 41 is superimposed on the D.C. cutting base current $I_B$. When the cutting operation is continued, steps 2 through 5 are repeatedly executed. This control is ended in coincidence with the end of the cutting operation.

As described, the cutting current supplied to the torch electrode 60 is controlled within a relatively low frequency range dependent upon the moving speed of the torch 16, i.e. the cutting speed. Therefore, the same pitch drag lines appear on the cut facet regardless of the change of the cutting speed. The irregularities on the cut facet can be suppressed to a minute level and thus the cut facet is smoothed.

Dross can further be prevented from being adhered to the cut facet as the frequency of the cutting current I is approximately equal to the frequency causing to remove the dross.

Although the present invention has been described with reference to a specific embodiment, it would be apparent for those skilled in the art that a variety of changes and modifications may be made without departing from the scope and spirit of the present invention. For example, the values of constant K may be stored in the ROM 56 in relation to parameters comprising the kind of workpiece material, the thickness thereof, the cutting base current and the operation gas, and a suitable value of the constant K may be selected while specifying those parameters.

What is claimed is:

1. An apparatus for plasma cutting a workpiece comprising:
    a cutting torch having a nozzle and an electrode for producing a plasma arc in accordance with a cutting current supplied to the electrode, said cutting torch being movably disposed relative to the workpiece and cutting the workpiece with the plasma arc;
    power supply means for supplying the cutting current to the electrode of said cutting torch, said power supply means including a D.C. current supplying means for supplying a D.C. current, pulse generating means for generating a pulsating current having a frequency, and superimposing means for superimposing the pulsating current on the D.C. current to produce the cutting current;
    moving means for moving said cutting torch relative to the workpiece;
    storage means for storing cut machining data;
    drive control means for numerically controlling said moving means in accordance with the cut machining data read out of said storage means, said moving means moving said cutting torch at a speed relative to the workpiece;
    speed detection means for detecting the moving speed of said cutting torch relative to the workpiece and outputting speed data; and
    frequency control means responsive to the speed data for varying the frequency of the pulsating current generated from said pulse generating means.

2. An apparatus according to claim 1, further comprising a control panel for manually inputting torch locus data and for manually specifying a material and a thickness of the workpiece, said control panel having a start switch for instructing commencement of the plasma cutting, and wherein said drive control means comprises a central processing means, an input/output interface connected to said central processing unit, driver means connected between said input/output interface and said moving means for driving said moving means, and a read-only memory storing programs for computing the cut machining data, the cut machining data thus computed being stored in said storage means, wherein said central processing unit reads the cut machining data out of said storage means when numerically controlling said moving means.

3. An apparatus according to claim 2, further comprising position detecting means for detecting a present position of said cutting torch, and wherein the programs stored in said read-only memory comprise an interpolation computing program for computing a position to which said cutting torch is to be moved based on the torch locus data inputted manually from said control panel and providing computed position data, numerical control program for computing a driving amount of said driver means based on the present position data and the computed position data, and tables containing D.C. current data and cutting speed data in relation to parameters regarding the material and the thickness of the workpiece.

4. An apparatus according to claim 3, wherein said speed detection means detects the moving speed based on the driving amount computed according to the numerial control program.

5. An apparatus according to claim 4, wherein said frequency control means controls the frequency of the pulsating current according to an equation defined by $f = K \times V$ where f is the frequency of the pulsating current expressed by herz, K is a preselected integer, and V is the moving speed of said cutting torch expressed by milimeters per second.

6. An apparatus according to claim 5, wherein the D.C. current is selected from the cutting base table in relation to the material data and thickness data both manually specified from said control panel, and wherein said power supply means further includes adjusting means connected between said pulse generating means and the electrode of said cutting torch for adjusting an effective value of the D.C. current to be in agreement with the D.C. current selected from the cutting base table, said adjusting means having a positive output terminal connected to the workpiece and a negative output terminal connected to the electrode of said cutting torch.

7. An apparatus according to claim 6, further comprising high frequency voltage generating means connected between said drive control means and the nozzle of said cutting torch for applying a high frequency voltage to the nozzle of said cutting torch so that a pilot arc is generated between the electrode and the nozzle, said high frequency voltage generating means receiving a start signal from said control panel and applying the high frequency voltage to the nozzle of said cutting torch during a period of time when the start signal is being received therefrom.

8. In an apparatus for plasma cutting a workpiece comprising:

a cutting torch having a nozzle and an electrode for producing a plasma arc in accordance with a cutting current supplied to the electrode, said cutting torch being movably disposed relative to the workpiece and cutting the workpiece with the plasma arc;

power supply means for supplying the cutting current to the electrode of said cutting torch, said power supply means including a D.C. current supplying means for supplying a D.C. current, pulse generating means for generating a pulsating current having a frequency, and superimposing means for superimposing the pulsating current on the D.C. current to produce the cutting current;

moving means for moving said cutting torch relative to the workpiece;

storage means for storing cut machining data;

drive control means for numerically controlling said moving means in accordance with the cut machining data read out of said storage means, said moving means moving said cutting torch at a speed relative to the workpiece; and speed detection means for detecting the moving speed of said cutting torch relative to the workpiece and outputting speed data, a method of plasma cutting the workpiece comprising the steps of:

varying the frequency of the pulsating current generated from said pulse generating means in accordance with the speed data.

* * * * *